United States Patent
McLean et al.

(10) Patent No.: US 10,135,613 B2
(45) Date of Patent: Nov. 20, 2018

(54) METHOD AND APPARATUS FOR GENERATING A PRIVILEGE-BASED KEY

(75) Inventors: Ivan Hugh McLean, San Diego, CA (US); Laurence G. Lundblade, San Diego, CA (US); Brian Harold Kelley, San Diego, CA (US); Robert G. Walker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 13/350,661

(22) Filed: Jan. 13, 2012

(65) Prior Publication Data

US 2013/0182838 A1    Jul. 18, 2013

(51) Int. Cl.
*H04L 9/08*    (2006.01)

(52) U.S. Cl.
CPC .......... *H04L 9/0861* (2013.01); *H04L 9/0866* (2013.01); *H04L 2209/603* (2013.01)

(58) Field of Classification Search
CPC .......... G06F 21/604; G06F 2221/2145; H04L 9/3236; H04L 9/3242; H04L 9/0861; H04L 9/0866; H04L 63/068
USPC ............ 380/44, 200; 713/180, 176; 726/4–7
See application file for complete search history.

(56) References Cited

U.S. PATENT DOCUMENTS

| | | | |
|---|---|---|---|
| 7,099,663 B2 | 8/2006 | Lundblade et al. | |
| 7,137,007 B2 | 11/2006 | Terao et al. | |
| 7,165,176 B2 | 1/2007 | Kyojima et al. | |
| 7,743,407 B2 | 6/2010 | Sprigg et al. | |
| 8,037,515 B2 * | 10/2011 | Lundblade | 726/6 |
| 8,077,870 B2 | 12/2011 | Wack et al. | |
| 8,312,262 B2 * | 11/2012 | Mauro, II | H04L 9/3247 |
| | | | 713/156 |
| 8,424,068 B2 * | 4/2013 | Lundblade | 726/6 |
| 8,505,078 B2 * | 8/2013 | Hohlfeld et al. | 726/5 |
| 2008/0173709 A1 | 7/2008 | Ghosh | |
| 2009/0178123 A1 | 7/2009 | Carpenter et al. | |
| 2010/0058064 A1 * | 3/2010 | Kirovski et al. | 713/176 |
| 2010/0195830 A1 | 8/2010 | Kubotera | |
| 2010/0262988 A1 | 10/2010 | Bauer et al. | |
| 2011/0116628 A1 | 5/2011 | Wack et al. | |
| 2013/0086662 A1 * | 4/2013 | Roth et al. | 726/7 |
| 2013/0227667 A1 * | 8/2013 | Lundblade | 726/7 |
| 2013/0326596 A1 * | 12/2013 | Hohlfeld et al. | 726/5 |

FOREIGN PATENT DOCUMENTS

| | | |
|---|---|---|
| CN | 1788245 A | 6/2006 |
| CN | 102316378 A | 1/2012 |
| GB | 2479074 A | 9/2011 |
| JP | 2000242491 A | 9/2000 |
| JP | 2002300158 A | 10/2002 |

(Continued)

OTHER PUBLICATIONS

International Search Report and Written Opinion—PCT/US2013/021344—ISA/EPO—dated Jul. 16, 2013.

*Primary Examiner* — Noura Zoubair
(74) *Attorney, Agent, or Firm* — Loza & Loza, LLP

(57) ABSTRACT

Disclosed is a method for generating a privilege-based key using a computer. In the method, a privilege is received from an application, and verified as being associated with the application. The computer cryptographically generates a second key using a first key and the privilege. The second key is provided to the application.

42 Claims, 3 Drawing Sheets

(56) References Cited

FOREIGN PATENT DOCUMENTS

| | | |
|---|---|---|
| JP | 2005236963 A | 9/2005 |
| JP | 2011028688 A | 2/2011 |
| WO | 2002097620 | 12/2002 |

* cited by examiner

METHOD AND APPARATUS FOR GENERATING A PRIVILEGE-BASED KEY

BACKGROUND

Field

The present invention relates generally to providing a secure cryptographic key to an application.

Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

Secure communications typically involves encryption of data using a secure key. The key must be securely maintained giving rise to key storage and management techniques.

There is therefore a need for a technique for effective provision of a secure key.

SUMMARY

An aspect of the invention may reside in a method for generating a privilege-based key using a computer. In the method, a privilege is received from an application, and verified as being associated with the application. The computer cryptographically generates a second key using a first key and the privilege. The second key is provided to the application.

In more detailed aspects of the invention, the first key may be a shared secret key, and/or a device key unique to a device. The second key may be an encryption key such as a temporary session key. The privilege may include a file system permission or a resource access right, and may be represented with a 32-bit integer. Cryptographically generating the second key using the first key and the privilege may include performing a hash, or similar one-way cryptographic operation, using the first key and the privilege as inputs to generate the second key.

Another aspect of the invention may reside in an apparatus for generating a privilege-based key, comprising: means for receiving a privilege from an application; means for verifying the privilege is associated with the application; means for cryptographically generating a second key using a first key and the privilege; and means for providing the second key to the application.

Another aspect of the invention may reside in an apparatus for generating a privilege-based key, comprising: a memory configured to store data; and a processor configured to: receive a privilege from an application; verify the privilege is associated with the application; cryptographically generate a second key using and the privilege and a first key stored in the memory; and provide the second key to the application.

Another aspect of the invention may reside in a computer program product, comprising: computer-readable medium, comprising: code for causing a computer to receive a privilege from an application; code for causing a computer to verify the privilege is associated with the application; code for causing a computer to cryptographically generate a second key using and the privilege and a first key; and provide the second key to the application.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
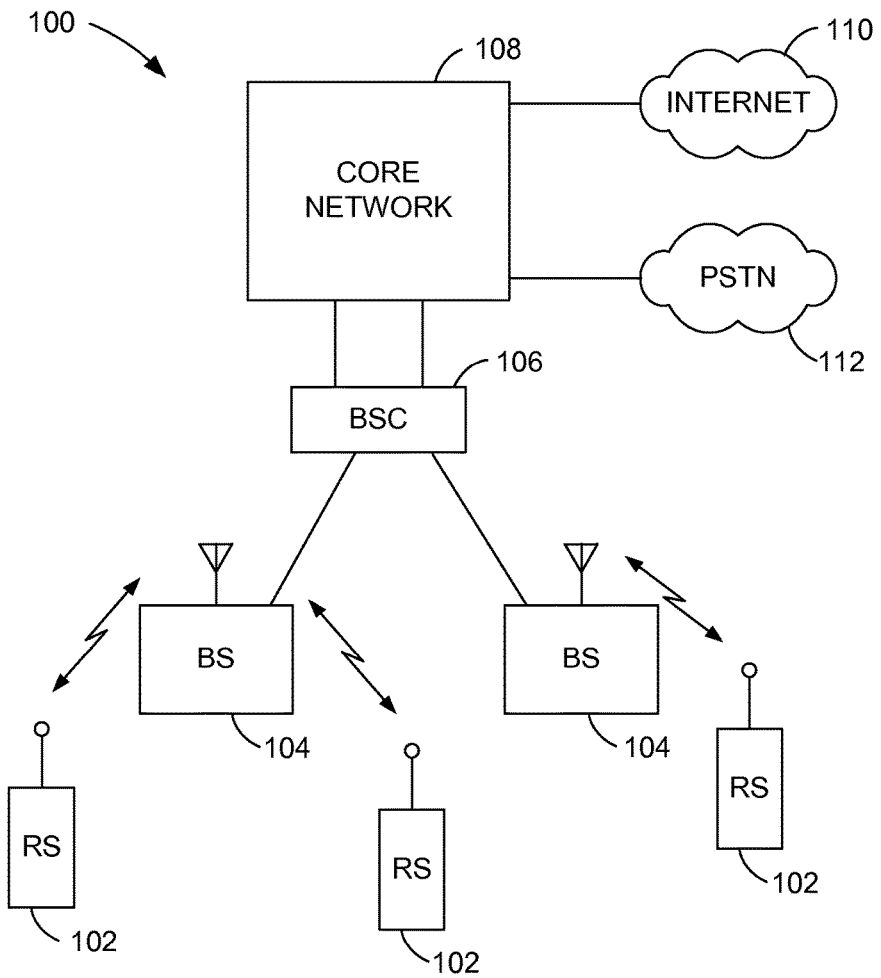
FIG. 1 is a block diagram showing an example of a wireless communication system.

With reference to FIG. 1, a wireless communication system 100 includes one or more wireless remote stations (RS) 102, one or more base stations (BS) 104, one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 3:
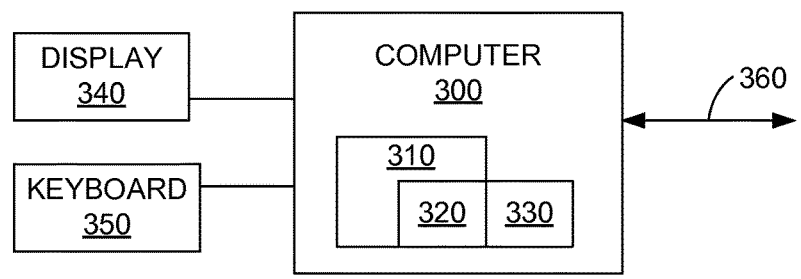
FIG. 3 is a block diagram showing an example of a computer for implementing the method for generating a privilege-based key.
Figure 2:
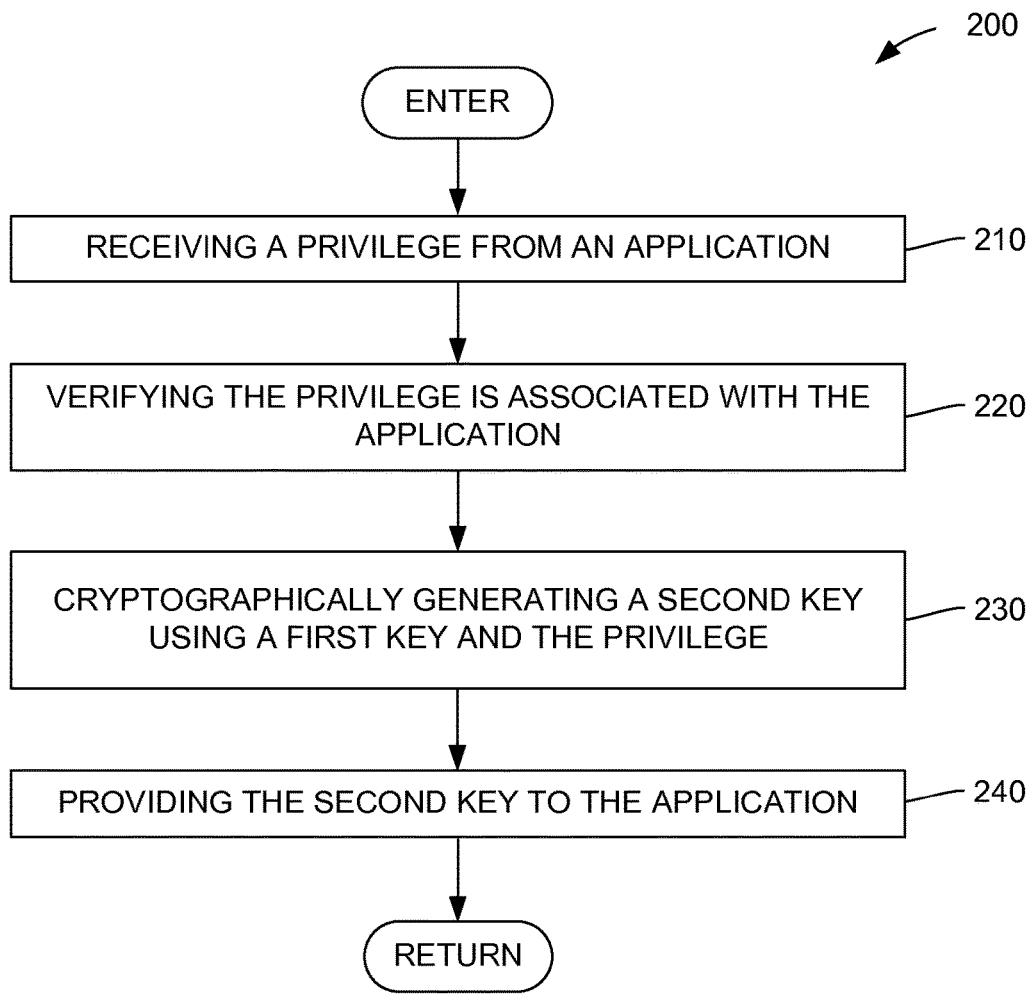
FIG. 2 is a flow diagram of a method for generating a privilege-based key, according to the present invention.
Figure 4:
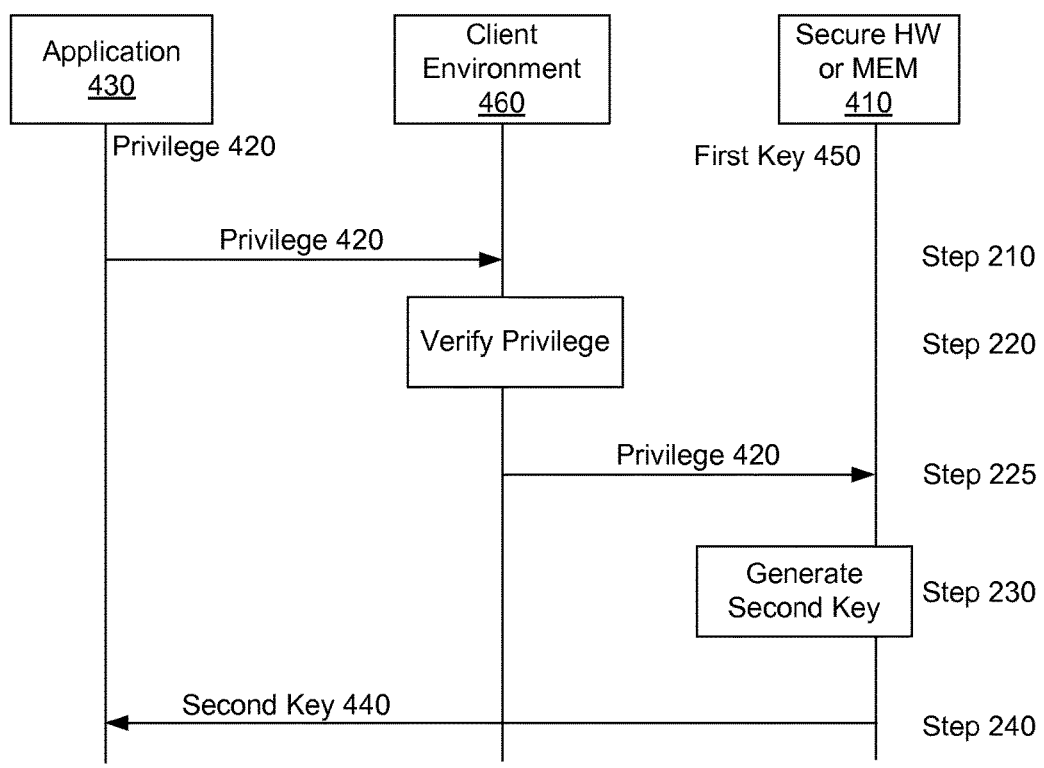
FIG. 4 is another flow diagram of a method for generating a privilege-based key, according to the present invention.

With reference to FIGS. 2 through 4, an aspect of the invention may reside in a method 200 for generating a privilege-based key using a computer 300. In the method, a privilege 420 is received from an application 430 (step 210), and verified as being associated with the application (step 220). The computer 300 cryptographically generates a second key 440 using a first key 450 and the privilege (step 230). The second key 440 is provided to the application (step 240).

In more detailed aspects of the invention, the first key 450 may be a shared secret key, and/or a device key unique to a device. Further, the first key may be an identifier that may function as a key. The second key 440 may be an encryption key such as a temporary session key. The privilege 420 may include a file system permission or a resource access right, and may be represented with an integer, such as an integer of 32 bits, 64 bits, 128 bits, etc. Cryptographically generating the second key using the first key and the privilege may include performing any suitable one-way cryptographic operation, such as a hash or HMAC (Hash-based Message Authentication Code), using the first key and the privilege as inputs to generate the second key.

A remote station 102 may be a computer 300 that includes a processor 310 having a secure hardware 320, memory (and/or disk drives) 330, a display 340, and keypad or keyboard 350. The computer may also include a microphone, speaker(s), camera, web browser software, and the like. Further, the remote station 102 may also include USB, Ethernet and similar interfaces 360, for communicating over a network, such as the internet 110, and may be a mobile station.

Another aspect of the invention may reside in an apparatus 300 for generating a privilege-based key, comprising: means 310 for receiving a privilege 420 from an application 430; means 310 for verifying the privilege is associated with the application; means 310 for cryptographically generating a second key 440 using a first key 450 and the privilege; and means 310 for providing the second key to the application.

Another aspect of the invention may reside in an apparatus 300 for generating a privilege-based key, comprising: a memory 330 configured to store data; and a processor 310 configured to: receive a privilege 420 from an application 430; verify the privilege is associated with the application; cryptographically generate a second key 440 using the privilege and a first key 450 stored in the memory; and provide the second key to the application.

Another aspect of the invention may reside in a computer program product, comprising: computer-readable medium 330, comprising: code for causing a computer 300 to receive a privilege 420 from an application 430; code for causing a computer to verify the privilege is associated with the application; code for causing a computer to cryptographically generate a second key 440 using and the privilege and a first key 450; and provide the second key to the application.

In an aspect of the invention, a mechanism is provided for generating a cryptographic key 440 based on a supplied privilege 420. An application 430 may request a key 440 from the client platform 300 by presenting a given privilege. Before the key 440 is issued, the requesting application is validated by the platform in order to ensure that it is a valid holder of the supplied privilege. Code signing is typically used to anchor the security and the validation of the application 430 and the privilege(s) 420 it is entitled to.

The generated cryptographic key 440 may be used to encrypt data, files or sensitive communications. Applications wishing to establish secure communications with each other, or wanting to share files or data may do so by establishing and agreeing upon a unique privilege 420. In the typical scenario, the application developer declares the relevant privilege(s) and the application 430 is then digitally signed by an authority.

Verifying that the privilege 420 is associated with the key-requesting application 430 may be accomplished using a digital signature created using the application and the associated privilege(s) (permissions), as described in U.S. Pat. No. 7,743,407. U.S. Pat. No. 7,743,407 is incorporated herein by reference.

The provided mechanism has a number of advantages over traditional key management/key storage schemes. It essentially does away with the need for the traditional centralized "secure key store." It provides a simple mechanism for applications to share information or establish secure communications, regardless of whether the applications are running on the same device or on different devices. It leverages the existing security of code signing and least privilege security models provided by client operating environments and platforms 460 such as BREW.

The client environment 460 may receive the privilege 420 from the application 430 (step 210), and verify that the privilege is associated with the application (step 220). The client environment 460 may then forward the verified privilege to secure hardware 410 (step 225) for generation of the second key 440 (step 230).

The second key 440 may be generated by means of performing a one-way cryptographic operation on the supplied privilege 420. For example, the second key may be generated by performing a Hash over the supplied privilege and some immutable/secret Device Key or Identifier 450. More specifically:

Second Key=HASH (Privilege+Device Key).

In another aspect, a shared secret key 450 may be used to facilitate the ability to securely share data between applications across devices. In this aspect, the second key 440 may be generated by performing a hash over the privilege 420 and a secret key 450 that is shared between multiple devices. More specifically:

Second Key=HASH (Privilege+Shared Secret Key).

The benefit of this approach is that direct use the shared secret key is not needed. Also, dedicated key establishment or key sharing is not needed between instances of the application on different devices.

The one-way cryptographic operation for generating the second key 440 may be performed by secure hardware 320/410 (and/or within a memory protection boundary). The first key (e.g., the device key or shared secret 450) is never exposed to the calling application 430 or non-system code.

The security may be built on the concepts of least privilege and code signing. If an application 430 wishes to gain access to a secure key 440, an application developer decides on a privilege 420, and includes that privilege when submitting the application to be signed by an authority. The privilege may be generated or selected based on an understanding that the privilege may be unique to this application, and may never be granted to any other application.

Alternatively, if an application developer wishes the application 430 to securely share information with other trusted applications, then the privilege 420 must be generated/selected/agreed upon based on an established trust relationship. Other applications will only be successfully signed with the privilege in question with the endorsement of the privilege owner/creator. Any other requests to be signed with the privilege(s) would be rejected.

Since the second key 440 is generated "on the fly", there is no need for the application(s) to maintain a secure key store. When using a device key 450, the generated key 440 is unique per privilege, per device. A request for a key with a given privilege 420 on the same device will always return the same second key 440, regardless of which application made the request, or when the request is made, or how many times the request is repeated over time. The immutable nature of the key relieves the calling application 430 from any responsibilities of key management or secure key storage. The second key 440 may be used by the application, and then destroyed.

Also, the application(s) are also free to use any number of different privileges 420 or privilege sets for different but related purposes. So for example, an application 430 may reserve one or more privileges for protecting data or files that it does not want to share with any other application. It may agree on another privilege (or set of privileges) that may be used to securely share some other information with a limited set of applications within a given circle of trust. And it may use yet another privilege to secure and share some other information with a different set of applications that have different security requirements or levels of trust.

As an example, a game application 430 may use a dedicated privilege 420 to retrieve a cryptographic key 440 that is only used to encrypt its license information. The privilege and associated key are unique to the application, and are not shared with any other application, or even the same application running on a different device.

The same game application 430 may use a different privilege 420' to retrieve an encryption key 440' that is used to encrypt client credentials. These credentials may be securely shared with other applications from the same vendor (or even trusted applications from a different vendor). In this case the intention would be that sharing be limited to applications running on the same device.

Further, the same game application 430 may use yet another different privilege 420" to retrieve a key 440" that is used to encrypt high scores and game state information. Key generation in this case could be based on the privilege 420" and a shared secret 450. Information protected in this way could be securely shared between applications on the same device, or applications with the required privileges running on a different device.

Different privileges 420, together with the associated cryptographic keys 440, may be used to control different types of access to the same resource. For example, an encrypted file system may enforce privileges such that privilege A/Key X may allow Read Access, while privilege B/Key Y may allow Read/Write Access.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on as one or more instructions or code on a computer-readable medium. Computer-readable media includes computer storage media that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer-readable medium may be non-transitory such that it does not include a transitory, propagating signal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for generating a privilege-based key, comprising:
    receiving, by a client environment, a list of privileges from a key-requesting application, wherein a digital signature is based on the list of privileges and program code of the key-requesting application;
    verifying, by the client environment, that the list of privileges is associated with the key-requesting application using the digital signature;
    if the list of privileges is verified by the client environment, then:
        forwarding, by the client environment, the verified list of privileges to a secure hardware;
        cryptographically generating, by the secure hardware, a second key using a first key and the verified list of privileges; and
        providing, by the secure hardware, the second key to the key-requesting application.

2. The method of claim 1, wherein the first key is a shared secret key.

3. The method of claim 1, wherein the first key is a device key unique to a device.

4. The method of claim 1, wherein the second key is an encryption key.

5. The method of claim 1, wherein the second key is a temporary session key.

6. The method of claim 1, wherein the list of privileges includes a file system permission.

7. The method of claim 1, wherein the list of privileges includes a resource access right.

8. The method of claim 1, wherein the list of privileges comprises a 32-bit integer.

9. The method of claim 1, wherein cryptographically generating the second key using the first key and the list of privileges comprises performing a hash using the first key and the list of privileges as inputs to generate the second key.

10. The method of claim 1, wherein cryptographically generating the second key using the first key and the list of privileges comprises performing a one-way cryptographic operation using the first key and the list of privileges as inputs to generate the second key.

11. The method of claim 1, wherein the list of privileges is associated with the key-requesting application by the digital signature.

12. The method of claim 11, wherein the list of privileges associated with the key-requesting application is declared by a developer of the program code of the key-requesting application, and wherein the program code includes an executable software module.

13. An apparatus for generating a privilege-based key, comprising:
    means for receiving a list of privileges from a key-requesting application, wherein a digital signature is based on the list of privileges and program code of the key-requesting application;
    means for verifying the list of privileges is associated with the key-requesting application using the digital signature; and
    means for forwarding, if the list of privileges is verified, the verified list of privileges;
    means for cryptographically generating a second key using a first key and the verified list of privileges; and
    means for providing the second key to the key-requesting application.

14. The apparatus of claim 13, wherein the first key is a shared secret key.

15. The apparatus of claim 13, wherein the first key is a device key unique to a device.

16. The apparatus of claim 13, wherein the second key is an encryption key.

17. The apparatus of claim 13, wherein the second key is a temporary session key.

18. The apparatus of claim 13, wherein the list of privileges includes a file system permission.

19. The apparatus of claim 13, wherein the list of privileges includes a resource access right.

20. The apparatus of claim 13, wherein the list of privileges comprises a 32-bit integer.

21. The apparatus of claim 13, wherein the means for cryptographically generating the second key using the first key and the verified list of privileges comprises means for performing a hash using the first key and the verified list of privileges as inputs to generate the second key.

22. The apparatus of claim 13, wherein the means for cryptographically generating the second key using the first key and the verified list of privileges comprises means for performing a one-way cryptographic operation using the first key and the verified list of privileges as inputs to generate the second key.

23. An apparatus for generating a privilege-based key, comprising:
    a memory configured to store data;
    a processor configured to:
        receive a list of privileges from a key-requesting application, wherein a digital signature is based on the list of privileges and program code of the key-requesting application;

verify the list of privileges is associated with the key-requesting application using the digital signature; and forward, if the list of privileges is verified, the verified list of privileges to a secure hardware; and the secure hardware configured to:

cryptographically generate a second key using the verified list of privileges and a first key stored in the memory; and provide the second key to the key-requesting application.

24. The apparatus of claim 23, wherein the first key is a shared secret key.

25. The apparatus of claim 23, wherein the first key is a device key unique to a device.

26. The apparatus of claim 23, wherein the second key is an encryption key.

27. The apparatus of claim 23, wherein the second key is a temporary session key.

28. The apparatus of claim 23, wherein the list of privileges includes a file system permission.

29. The apparatus of claim 23, wherein the list of privileges includes a resource access right.

30. The apparatus of claim 23, wherein the list of privileges comprises a 32-bit integer.

31. The apparatus of claim 23, wherein to cryptographically generate the second key using the first key and the verified list of privileges comprises to perform a hash using the first key and the verified list of privileges as inputs to generate the second key.

32. The apparatus of claim 23, wherein to cryptographically generate the second key using the first key and the verified list of privileges comprises to perform a one-way cryptographic operation using the first key and the verified list of privileges as inputs to generate the second key.

33. A non-transitory computer-readable medium, comprising:

code for causing a computer to receive a list of privileges from a key-requesting application, wherein a digital signature is based on the list of privileges and program code of the key-requesting application;

code for causing the computer to verify the list of privileges is associated with the key-requesting application using the digital signature; and code for causing the computer to forward, if the list of privileges is verified, the verified list of privileges to a secure hardware configured to cryptographically generate a second key using the verified list of privileges and a first key stored in the memory, and provide the second key to the key-requesting application.

34. The computer-readable medium of claim 33 wherein the first key is a shared secret key.

35. The computer-readable medium of claim 33, wherein the first key is a device key unique to a device.

36. The computer-readable medium of claim 33, wherein the second key is an encryption key.

37. The computer-readable medium of claim 33, wherein the second key is a temporary session key.

38. The computer-readable medium of claim 33, wherein the list of privileges includes a file system permission.

39. The computer-readable medium of claim 33, wherein the list of privileges includes a resource access right.

40. The computer-readable medium of claim 33, wherein the list of privileges comprises a 32-bit integer.

41. The computer-readable medium of claim 33, wherein to cryptographically generate the second key using the first key and the verified list of privileges comprises to perform a hash using the first key and the verified list of privileges as inputs to generate the second key.

42. The computer-readable medium of claim 33, wherein to cryptographically generate the second key using the first key and the verified list of privileges comprises to perform a one-way cryptographic operation using the first key and the verified list of privileges as inputs to generate the second key.

* * * * *